No. 633,592. Patented Sept. 26, 1899.
A. HOLLAND.
ACETYLENE GAS GENERATOR.
(Application filed Nov. 17, 1898.)
(No Model.)
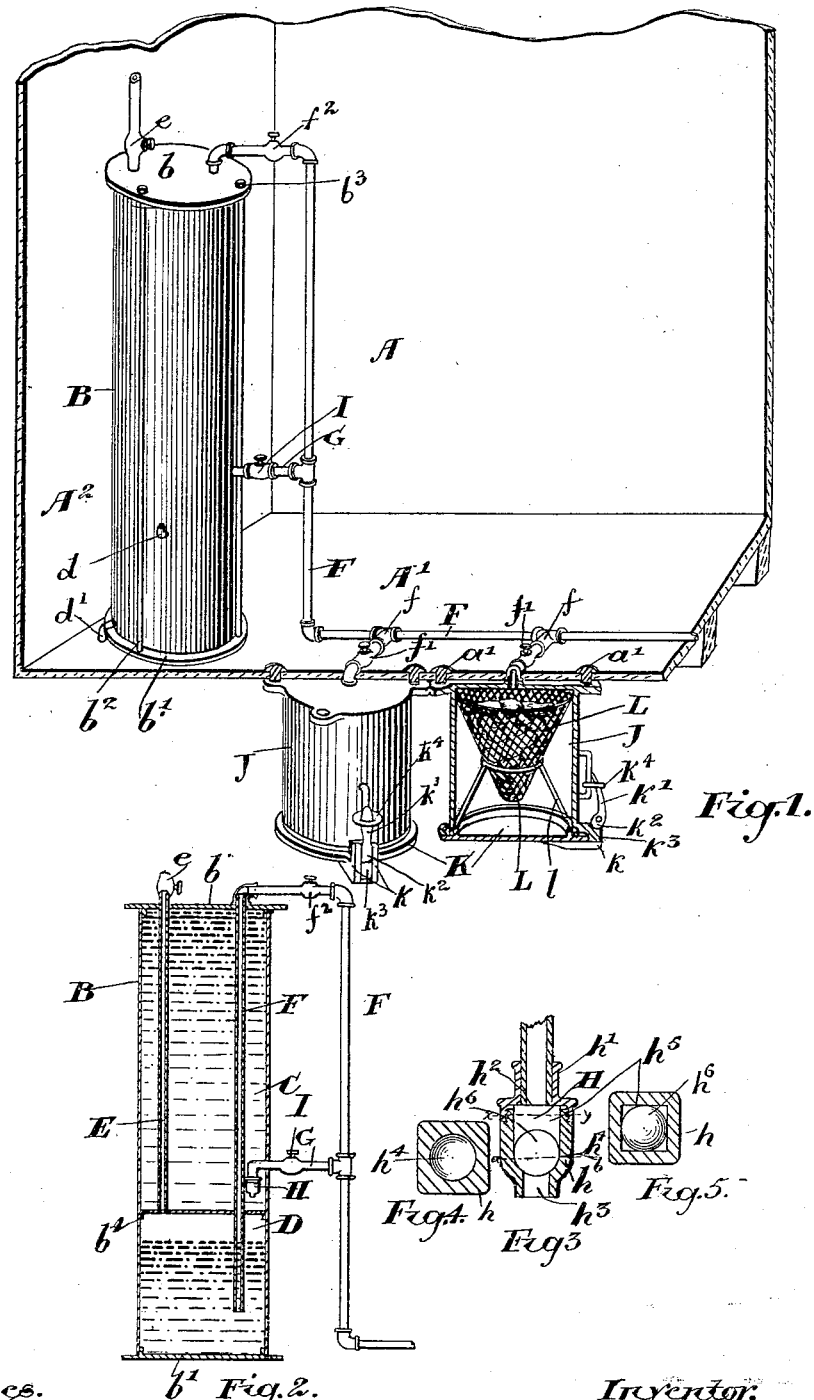
Witnesses.
Inventor.
Andrew Holland.

UNITED STATES PATENT OFFICE.

ANDREW HOLLAND, OF OTTAWA, CANADA.

ACETYLENE-GAS GENERATOR.

SPECIFICATION forming part of Letters Patent No. 633,592, dated September 26, 1899.

Application filed November 17, 1898. Serial No. 696,698. (No model.)

*To all whom it may concern:*

Be it known that I, ANDREW HOLLAND, a subject of the Queen of Great Britain, residing at Ottawa, in the county of Carleton, in the Province of Ontario, Canada, have invented a new and useful Improvement in Acetylene-Gas Machines, of which the following is a specification.

My invention relates to improvements in acetylene-gas machines; and the object of the invention is, first, to provide one especially adaptable to railroad use, such as car-lighting and locomotive head-lighting, where the machine is subject to the vibration, oscillation, and frequent shocks to the train or locomotive; secondly, to provide a machine in which the gas-pressure to the burner is sufficient to overcome the draft from the door or window; thirdly, to provide a machine in which there is no danger of the gas exploding, the generation of gas not exceeding a certain limit, which limit is regulated by the pressure of water in the water-chamber, and, fourthly, to provide a machine in which the supply of water is very gradual, thus overcoming any danger of the water freezing in winter-time, the water supplied being heated by the generating action of the gas.

To carry out these objects, my invention consists in the novel arrangement and construction of parts, as hereinafter more particularly explained in detail.

In the drawings like letters of reference indicate corresponding parts in each figure.

Figure 1 is a perspective view of my machine, showing one generator in section and showing it in form adaptable to the lighting of cars. Fig. 2 is a section through the gas-holder and the water-chamber. Fig. 3 is a sectional detail of the check-valve. Fig. 4 is a cross-section through Fig. 3 on the line $a\ b$. Fig. 5 is a similar view on the line $x\ y$.

A is the body of the car, A' is the floor thereof, and $A^2$ the walls.

B is a cylinder having end plates $b\ b'$, secured together by rods and bolts $b^2\ b^3$, respectively.

$b^4$ is a partition dividing the cylinder into two compartments C and D. The chamber C is filled with water and the chamber D partially so.

$d$ is an opening through which the chamber D may be supplied with water.

$d'$ is an outlet-pipe for draining off the impure water.

E is a feed-pipe leading from the lower chamber, but from above the water contained therein, to the gas-jets and provided with a suitable cock $e$ for closing the same.

F is a pipe extending down into the water in the lower chamber, its opposite end being connected to the generator by the branch pipes $f$. The branch pipes $f$ are provided with suitable cocks $f'$ to cut off the water flowing into the generator. The pipe F passes loosely through the head of the cylinder B, and an air-vent is thus provided for the latter around said pipe.

G is a cross-pipe connecting the upper chamber C to the exterior portion of the pipe F.

H is a check-valve placed in the pipes G, formed of a casing $h$, a screw-top $h'$, and openings $h^2\ h^3$ in the top and bottom thereof.

$h^4$ is a valve-seat concave in form, gradually merging into the square portion $h^5$.

$h^6$ is the ball of the valve.

The pipe F is also provided with a cock $f^2$ to cut off the supply of gas to the gas-holder.

J J are the generators, connected as aforesaid to the pipe F, leading to the chamber D of the cylinder B. The generators are bolted to the floor of the car by means of bolts $a'$.

K are the lids of the generators, suitably hinged thereto.

$k\ k$ are a pair of lugs formed on the lid K and having between them the lever $k'$, having a cam-shaped end $k^2$.

$k^3$ is a lug formed on the body of the generator and extending between the lugs formed on the lid and which serves to form a fulcrum for the lever $k'$. The lever $k'$ is secured by the link $k^4$, secured to the generator.

L is the carbid-holding basket, suitably supported in the generator J by legs $l$.

Having now described the principal parts involved in my invention, I shall describe the operation of the same.

The chamber C is filled with water and the chamber D partially so. The cock I is then opened and allowed to remain open during the operation of the machine. Water flows through the pipes G F $f$ to the generator, which has its cock $f'$ open. The gas passes through the pipes $f$ F into the gas-chamber, passing in this operation through the water in the chamber D, which serves to purify it, and it is then ready for consumption. The water in the chamber D forms a cushion for the gas compressed in the space above its surface, serving to produce an even feed to the gas-jets. As soon as the gas-pressure falls below the water-pressure in the chamber C the check-valve H is opened by such water-pressure, thus feeding more water to the generators J. When the gas-pressure overcomes the water-pressure, it closes the valve H, cutting off the water-supply.

What I claim as my invention is—

In combination with a generator, a vertically-arranged cylinder having a gas-chamber in its lower end and a water-chamber in its upper end, a feed-pipe leading from the gas-chamber to the point of consumption, a pipe leading from the generator to the gas-chamber, a branch pipe tapping the gas-pipe intermediate of its length and connecting it with the water-chamber near the bottom thereof and a valve located in said branch pipe closed by the gas-pressure to prevent the discharge of water when not required and opened by the water-pressure when the gas-pressure is reduced, substantially as described.

Ottawa, Canada, October 29, 1898.

ANDREW HOLLAND.

Witnesses:
H. S. S. YOUNG,
OSCAR GROUT.